United States Patent Office 3,283,031
Patented Nov. 1, 1966

---

3,283,031
RIGID POLYVINYL CHLORIDE COMPOSITIONS CONTAINING POLYURETHANE ELASTOMERS, AND A COPOLYMER OF A STYRENE AND AN ETHYLENICALLY UNSATURATED NITRILE
Charles E. Greene, Akron, and Francis J. Maurer, Tallmadge, Ohio, assignors to The General Tire & Rubber Company, Akron, Ohio, a corporation of Ohio
No Drawing. Filed Mar. 13, 1963, Ser. No. 264,748
4 Claims. (Cl. 260—859)

This application is a continuation-in-part of our prior copending application Serial No. 714,968, filed February 13, 1958, and entitled "Rigid Polyvinyl Chloride Compositions Containing Polyurethane Elastomers," now abandoned.

This invention relates to rigid polyvinyl chloride compositions which have the excellent solvent and fire resistance of the non-compounded polyvinyl chloride resins but which are more easily processed. This invention more particularly relates to a rigid, tough, impact-resistant thermoplastic polyvinyl chloride base composition which can be relatively easily milled, calendered, extruded and vacuum-formed.

In the past the inherent fragility of rigid polyvinyl chloride base materials has been improved by incorporating rubbery copolymers of butadiene and acrylonitrile therein. While such rubbery copolymers imparted to the compositions very high impact resistance properties with only slightly reduced heat-distortion properties, these compositions were not as resistant as desired when subjected to ultraviolet light over a long period of time. This was apparent because of the unsaturation in the structure of the rubbery copolymers.

It is an object of the present invention to provide a rigid, impact resistant polyvinyl chloride base composition which has high impact resistance, good heat distortion properties, good hardness and good resistance to sunlight aging.

It is an object to provide a rigid polyvinyl chloride composition with excellent sunlight resistance as well as good impact resistance and heat distortion properties, and which composition may be processed more easily than unplasticized polyvinyl chloride.

The above and other objects, which will be apparent from the following description of the invention, are accomplished by combining polyvinyl chloride, a resinous high styrene copolymer, and relatively small proportions of a polyurethane elastomer which we have found affects polyvinyl chloride in a manner apparently similar to nitrile rubbers but without the aforesaid disadvantages. In addition the processibility of the polyvinyl chloride composition is greatly improved.

The polyurethanes suitable are reaction products of an organic diisocyanate with an active hydrogen containing compound such as a dihydroxy polyester or polyether. While polyesters or polyethers should have a molecular weight of over 500, the molecular weight is generally at least about 900 to 1000 and is preferably from about 2000 to 4000.

Suitable polyurethanes may be prepared as described in U.S. application Serial No. 535,280 of Gruber et al. filed September 10, 1955, now abandoned, and assigned to the assignee of the present application, or as described in one or more of the following patents:

British Patent No. 694,978 published 1953
U.S. Patent No. 2,625,531 to Seeger
U.S. Patent No. 2,620,516 to Muller
U.S. Patent No. 2,625,535 to Mastin et al.

As is well known, the reaction of the isocyanate groups of the diisocyanate and the active hydrogen atoms of the hydroxyl groups of a polyol such as a polyester or polyether forms a polymer with recurring linking units of the following general structure:

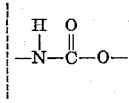

As used herein, the term polyol is a substantially linear long chain active hydrogen containing compound having a molecular weight of generally about at least 500 and terminated with hydroxyl groups containing active hydrogen atoms. Examples of polyols are hydroxy terminated polyesters and polyethers such as poly(ethylene-propylene) adipate and polytetramethylene ether glycol. The molecular chain of the polyol extending between terminal hydroxyl groups preferably contains only carbon, hydrogen and oxygen atoms. The chain itself has only carbon to carbon or carbon to oxygen linkages. While some unsaturation or double bonds may be present, the carbon to carbon linkages are preferably of the aliphatically saturated type.

Suitable diisocyanates are any aromatic and/or aliphatic diisocyanates such as p,p'-diisocyanato diphenyl methane, 2,4-tolylene diisocyanate, naphthalene-1,5-diisocyanate and hexamethylene diisocyanate.

The preferred polyurethane elastomers are generally linear, rubbery or millable polymers of the solid non-porous type and are formed from about equal moles of a diisocyanate and a dihydroxy terminated polyester or polyether, although suitable elastomers can be made from about 0.8 to 1.5 equivalent weights of organic polyisocyanate having 2 to 3 isocyanato groups per equivalent of polyester or polyether. When trifunctional polyols or triisocyanates (for example naphthalene triisocyanate) are used, the amount of polyisocyanate used is about one equivalent weight per equivalent weight of polyol. Branch chain polyether polyols (trifunctional etc.) are those in which a small amount of a polyhydric alcohol is reacted with a large amount of an alkylene oxide and so forth as shown in the patent to Price, U.S. Pat. No. 2,866,774. Likewise, branch chain polyesters may be employed in which a small amount of a triol such as glycerol etc. is mixed with a large amount of a diol such as a glycol and then reacted with a dicarboxylic acid. Alternatively, a small amount of a tricarboxylic acid etc. can be mixed with a large amount of a dicarboxylic acid and then reacted with a diol such as ethylene glycol, diethylene glycol etc. to make a polyester.

The polyurethanes used in the present invention are preferably polyester diisocyanate reaction products although benefits are obtainable with polyether diisocyanate polyurethane. The compatibility of the ether group with polyvinyl chloride is not as great as that of the ester group and the compatibility of the elastomers apparently affects impact, heat distortion, and hardness properties. Generally when the compatibility of the rubber is too great or little, the resistance to fragility or impact strength is less than desired.

In order to obtain superior processing properties for extruding, deep drawing, or the like, about 13 to 35% by weight of a high styrene resinous copolymer may be added per 47 to 77% by weight of polyvinyl chloride together with about 10 to 18% by weight of polyurethane elastomer, the total of these polymers in the resulting composition amounting to 100% by weight. These rigid impact resistant, sunlight resistant compositions may then be formed easily by methods such as deep drawing and vacuum forming to make bowls, cups, arm rests and so forth. The preferred amount of polyurethane elastomer is about 13 to 16% by weight per 52 to 72% by weight of polyvinyl chloride and 15 to 32% by weight of styrene resinous copolymer, such as a 70 styrene-30 acrylonitrile copolymer resin for the best balance of flow properties and impact resistance, the total of these polymers in the resulting composition amounting to 100% by weight. Generally about 14% by weight of polyurethane may be used with the above stated percentages of polyvinyl chloride and high styrene resinous copolymer in order to obtain the best flow properties and age resistance without too much of a reduction in equally important properties such as impact resistance, heat distortion, and rigidity. More than 20% by weight of polyurethane imparts greatly decreased properties of heat distortion, hardness and rigidity to the blend. On the other hand, at least four percent by weight of polyurethane should be used to provide improved properties of resistance to sunlight aging and some resistance to impact. Such a blend will process better than does polyvinyl chloride alone, and no cold or hot mill breakdown is generally needed for good processing.

The polyvinyl chloride may be mixed with the rubbery polymers and high styrene resinous copolymer in any convenient manner as, for example, by means of a rubber mill, Banbury or other mechanical mixing or masticating apparatus. Generally, for example, the polyvinyl chloride is pre-mixed with stabilizers and pigments while in the dry state and then added to the high styrene resinous copolymer on a mill. The mill may be heated to about 300, or even up to 350 degrees F. which is preferably substantially under the melting point of the polyurethane, for the best impact resistant properties, and the dry mix is loaded on the mill at a tight setting, and then the mill may be opened up to about 100 mils. The polyurethane rubber then may be added conveniently and milled in for about 10 minutes while the stock temperature is about 200 to 400° F. The rolls may then be set to give a 75 mil sheet, and the composition is then sheeted out. The sheets may be further processed by molding or other operation in order to form rigid, impact resistant, and sunlight resistant articles.

The styrene-acrylonitrile copolymer portion used for improving processability preferably contains from 60 to 85% styrene and 40 to 15% acrylonitrile by weight of the copolymer. The copolymer preferably is added in amounts of about 21 to 62 parts by weight for every 100 parts of polyvinyl chloride. When more than 80 parts of resinous copolymer is used per 100 parts of polyvinyl chloride, the resultant mixture is too brittle for ordinary commercial applications.

In the styrene-acrylonitrile copolymer, the styrene may be replaced by nuclear-substituted styrene homologs such as 3,4-dichlorostyrene, dimethylstyrene etc. or alpha substituted styrenes such as alphamethylstyrene, alpha methoxy styrene and 3,4-dichloro alphamethylstyrene. Likewise acrylonitrile may be replaced by methacrylonitrile, ethacrylonitrile, chloroacrylonitrile, and other copolymerizable nitriles of an alpha substituted, beta unsaturated acid having less than six aliphatic carbon atoms. Suitable alpha substituents are halogen (preferably chlorine) and alkyl radicals of 1 to 4 carbon atoms.

Compounding ingredients can be added to the polymeric blends of this invention as it well known to the art such as pigments, fillers, antidegradants, age resistors and so forth.

The following examples illustrate the preparation of the composition in accordance with the present invention and parts are by weight unless otherwise stated.

EXAMPLE I

A polyester, useful as a base material for reaction with the diisocyanate in accordance with this invention, was prepared as follows:

Ethylene glycol (6.7 mols) and propylene glycol (3.3 mols) were charged into a reaction vessel with 8.4 mols of adipic acid and the mixture was continuously stirred. The mixture was heated and refluxed to remove water and excess glycol. The reaction was stopped when the molecular weight of the linear polymer product was about 2000, the acid number 1 and the viscosity 500 c.p.s. at 73° C.

EXAMPLE II

A typical polyurethane, useful in the present invention, may be prepared from the following amounts of polyester and diisocyanate:

1 mol polyester (ethylene—67% by weight propylene—33% adipate; mol weight 2000 and acid number under one. Viscosity 500 c.p.s. at 73° C.) Prepared as in Example I 1 mol of p,p'-diisocyanate-diphenyl-methane (MDI)

The mixture was allowed to stand two hours at 115° C. in a closed container and a polyurethane elastomer was formed.

EXAMPLE III

A series of polyvinyl chloride, styrene resinous copolymer, and polyurethane rubber mixtures were prepared using the ratios of polyvinyl chloride, styrene resin, and polyurethane rubber as shown in Table I. A control sample "G" was also prepared using a nitrile rubber in place of the urethane rubber.

*Table I*

| Composition | Resin | Rubber | Ratio PVC/Resin/Rubber |
|---|---|---|---|
| E | Styrene-acrylonitrile copolymer (72/28). | 80/20 polyethylene propylene adipate, MDI. | 60/40/15 |
| F | ----do---- | 80/20 polyethylene propylene adipate, TDI (80/20 mixture of 2,4 and 2,6-tolylene diisocyanates). | 60/40/15 |
| G | ----do---- | 82 Butadiene-18 Acrylonitrile copolymer. | 60/40/13.5 |

The polyvinyl chloride and styrene-acrylonitrile resin were loaded on a mill and the polyurethane elastomer added to the polyvinylchloride mixture. After milling for ten minutes at a stock temperature of 350 to 360° F., the metal rolls were set to give a 75 mill sheet and the resultant blend sheeted off and cut into test specimens. The sheets were aged for 16 to 24 hours at 77° F. and 50% humidity and thereafter tested as indicated in Table II.

Table II

| Test | E | F | G |
|---|---|---|---|
| Heat Distortion, in° C. at 264 p.s.i.: | | | |
| +10 | 77 | 72 | 77.5 |
| +60 | 83 | 80.5 | 89 |
| Rockwell "R" Hardness | 111 | 113 | 110 |
| Flexural Strength, p.s.i. | 9,200 | 9,300 | 8,700 |
| Flexural Modulus, p.s.i. × 10⁵ | 3.4 | 3.5 | 2.95 |
| Flexural Cracking (Number of 180° bends to failure) | 3 | 7 | 15+ |
| Crazing (after 384 hours in ultra violet light) | (¹) | (¹) | (²) |
| Ultra Violet Color Stability after 384 hours | (³) | (⁴) | (⁵) |
| Flow area in square inches for samples of equal volume at— | | | |
| 165° C | 9.9 | 10.2 | 6.9 |
| 180° C | 11.2 | 11.4 | 7.6 |
| 200° C | 14.8 | 15.0 | 8.5 |
| Impact Resistance: Izod ft. pounds per inch of notch | 1.4 | 1.4 | 9.0 |

¹ Very slight.
² Definite.
³ Good.
⁴ Excellent.
⁵ Fair.

As noted in the Table II, the polyurethane rubber compositions have good heat distortion, impact resistance, and hardness properties. When the compositions as shown in Table II were subjected to weatherometer and heat aging tests, the compositions of this invention were found to have excellent resistance to air oxidation and sunlight attack.

Unexpectedly the flow properties of the polyurethane rubber/resin/polyvinyl chloride compositions are greatly superior to the control and are in the order of an improvement of at least 40% at 165° C. and at least 50% at temperatures of 180° C. and 200° C.

The flow property of the polyurethane rubber is important for forming operations since the polyurethane should have the property of changing from a rubber-like material at room temperature to a liquid at elevated temperatures, especially around 180° to 200° C. Accordingly, the amount of flow of the rubbers at 165°, 180° and 200° C. was measured and reported in units of square inches.

The impact strength was obtained by the standard notch Izod test using the procedure set forth in D256–43T of the American Society of Testing Materials publication. A sample 2½″ x ½″ x ¼″ was used for this test. Hardness was evaluated under standard conditions recognized by ASTM using a Rockwell testing machine. The tensile and elongation were measured on a Scott testing machine utilizing an elongation rate of 2″ per minute. Heat distortion temperature was measured in accordance with ASTM test designation D648–45T utilizing a load of 264# on test bars 5″ x ½″ x ¼″. The heat distortion temperature shown in the table is the temperature in degrees C. at which a definite deflection appears under such load.

The above physical properties were obtained by testing sheets prepared by sheeting off slabs from a mill at 75 mils thickness and laminating these slabs to the proper thickness under 200 to 500 p.s.i. at a temperature of about 350° Fahrenheit. The resultant molded articles may be improved to some extent by annealing them at a temperature of about 160° F. for 3 to 5 hrs.

EXAMPLE IV

Another series of polyvinyl chloride/styrene-acrylonitrile resin/polyurethane rubber mixtures were prepared as in Example III except that the proportions and type of polyurethane rubber were different as seen below:

| Composition | Resin | Polyurethane Rubber | Ratio PVC/Resin/Rubber |
|---|---|---|---|
| H | Styrene-acrylonitrile (65–35) copolymer. | Polytetramethylene etherglycol:MDI. | 50/35/15 |
| I | Styrene-acrylonitrile (80–20) copolymer. | Poly(80/20 ethylene-propylene) ether glycol:MDI. | 56/32/12 |
| J | Styrene-acrylonitrile (72–28) copolymer. | Polytrimethylene ether glycol:naphthalene-1,5-diisocyanate. | 50/34/16 |

The resutlant compositions exhibited a good balance of heat distortion, hardness and impact resistance. In addition their sunlight and weathering properties were excellent. Also of great importance, the flow properties were unusually good so that the compositions could be easily processed without cold or hot mill breakdown generally required in polyvinyl chloride/resin processing.

EXAMPLE V

A heterogeneous mixture of polyvinylchloride/styrene-acrylonitrile resin/polyurethane rubber was prepared according to the method described in Example III. The composition is set forth below.

| Resin | Polyurethane Rubber | Ratio PVC/Resin/Rubber |
|---|---|---|
| Styrene-acrylonitrile (72–28) copolymer. | Polytetramethylene ether glycol:MDI. | 74/13/13 |

The physical properties of the above composition were determined according to standard testing proceduces previously described, the results of which are as found in Table III below:

Table III

Heat distortion @ 264 p.s.i.:
+10 _____ 77° C.
+60 _____ 83° C.
Rockwell "R" hardness _____ 108.
Flexural strength—p.s.i. _____ 8,860.
Flexural modulus—p.s.i. _____ $3.3 \times 10^5$.
Flexural cracking _____ 15+.
Crazing (384 hours) _____ Very slight.
Color stability (384 hours) _____ Very good.
Flow (sq. in.):
180° C. _____ 9.5.
200° C. _____ 13.0.
Notched Izod (ft. lbs./inch.) _____ 3.1.

In the above examples the polyesters and polyether glycols of the polyurethane rubbers may be substituted in whole or part by other polyethers such as polyethylene ether glycol, and other polyesters such as poly (ethylene-butylene) sebacate as previously discussed.

The polyvinylchloride of Examples III and IV may be substituted for in whole or in part by other polyvinyl halides such as polyvinyl bromide, fluoride and iodide. Suitable polyvinyl resins are compounds selected from a member of the group consisting of polyvinyl halides and copolymers composed predominantly of polymerized vinyl halides such as copolymers of vinyl chloride and vinyl acetate, although the best results are obtained by using a homopolymer of vinyl chloride.

Furthermore, it is to be understood that in accordance with the provisions of the patent statutes, the particular form of composition shown and described and the particular procedure set forth are presented for purposes of explanation and illustration and that various modifications of said composition and procedure can be made without departing from our invention.

Having thus described our invention, what we claim is:
1. A rigid, impact-resistant, age-resistant, thermoplastic composition comprising (a) 47 to 77% by weight of a polymer composed predominantly of polymerized vinyl halide, (b) about 13 to 35% by weight of a resinous copolymer of a compound selected from the group consisting of styrene, alpha methyl styrene and nuclear substituted styrenes and a copolymerizable ethylenically unsaturated nitrile, said copolymer containing from about 15 to 40% by weight of said nitrile, and (c) about 10 to 18% by weight of a rubbery polyurethane selected from the group consisting of rubbery polyesterurethanes and rubbery polyetherurethanes.

2. A rigid, impact-resistant, age-resistant polyvinyl halide composition comprising (a) 52 to 72% by weight of a rigid vinyl halide homopolymer, (b) 15 to 32% by weight of a resinous copolymer comprising about 60 to 85% by weight of styrene and about 15 to 40% by weight of a copolymerizable acrylonitrile, and (c) about 13 to 16% by weight of a polyurethane comprising a rubbery reaction product of approximately equimolar amounts of an organic diisocyanate and a saturated dihydroxy terminated compound having a molecular weight of at least 500 and being selected from the group consisting of (1) a polyalkylene ether glycol, and (2) a polyester comprising the reaction product of a glycol and a dicarboxylic acid.

3. A rigid, impact-resistant, age-resistant polyvinyl halide composition comprising (a) 47 to 77% by weight of a copolymer of vinyl chloride and vinyl acetate in which vinyl chloride is a major part of the copolymer, (b) about 13 to 35% by weight of a resinous copolymer comprising about 60 to 85% by weight of styrene and about 15 to 40% by weight of acrylonitrile, and (c) about 10 to 18% by weight of a polyurethane comprising a rubbery reaction product of approximately equimolar amounts of an organic diisocyanate and a saturated dihydroxy terminated compound having a molecular weight of at least 500 and being selected from the group consisting of (1) a polyalkylene ether glycol, and (2) a polyester comprising the reaction product of a glycol and a dicarboxylic acid.

4. A rigid, impact-resistant compound comprising (a) 52 to 72% by weight of polyvinyl chloride, (b) 15 to 32% by weight of a resinous copolymer of about 60 to 85% by weight of styrene and about 40 to 15% by weight of acrylonitrile, and (c) about 13 to 16% by weight of a rubbery polyurethane comprising the reaction product of approximately equimolar amounts of an organic diisocyanate and a saturated dihydroxy terminated compound having a molecular weight of at least 500 and being selected from the group consisting of (1) a polyalkylene ether glycol, and (2) a polyester comprising the reaction product of a glycol and a dicarboxylic acid.

References Cited by the Examiner

UNITED STATES PATENTS

| | | | |
|---|---|---|---|
| 2,606,162 | 8/1952 | Coffey et al. | 260—22 |
| 2,646,417 | 7/1953 | Jennings | 260—895 |
| 2,753,322 | 7/1956 | Parks et al. | 260—899 |
| 2,888,433 | 5/1959 | Parker | 260—859 |

MURRAY TILLMAN, *Primary Examiner.*

J. C. BLEUTGE, *Assistant Examiner.*